United States Patent [19]

Brown

[11] 3,878,329

[45] Apr. 15, 1975

[54] ORTHOSCOPIC IMAGE TUBE

[75] Inventor: Kenneth A. Brown, Saugus, Calif.

[73] Assignee: International Telephone and Telegraph Corporation, New York, N.Y.

[22] Filed: Aug. 22, 1973

[21] Appl. No.: 390,338

[52] U.S. Cl. .................... 178/7.85; 178/65; 313/83; 315/13 C; 340/324 AD; 350/167

[51] Int. Cl. .................................................. H04n 5/64

[58] Field of Search .............. 178/7.85, 6.5; 315/22, 315/13 C; 340/324 AD; 350/167, 96 B; 313/83, 85

[56] References Cited

UNITED STATES PATENTS

| | | | |
|---|---|---|---|
| 3,657,981 | 4/1972 | Benton | 350/167 |
| 3,658,407 | 4/1972 | Kitano | 350/96 B |
| 3,678,184 | 7/1972 | Kurokawa | 350/167 |
| 3,688,045 | 8/1972 | Ohkoshi | 350/167 |
| 3,688,144 | 8/1972 | Harao et al. | 178/7.85 |
| 3,798,478 | 3/1974 | Say | 313/83 |

*Primary Examiner*—Howard W. Britton
*Assistant Examiner*—Michael A. Masinick
*Attorney, Agent, or Firm*—William T. O'Neil

[57] ABSTRACT

A cathode-ray tube arrangement for presenting third dimensional effects without the use of special glasses and without mechanical motion. The device combines the features of integral photography with a unique set of electron optics duplicating the action of the "fly's eye" lens array looking at a moving point of light. A mosaic of tiny pictures is generated at the phosphor plane, and these are carried forward to the focal plane of the lens array through a fiber-optic face plate. These multiple pictures represent the light rays from a point of light as some position in the image space. The electron beam within the tube acts in a manner equivalent to the source of light for the picture mosaic. Ordinary deflection and focusing circuits are used to provide for shifting the image of the point of light very rapidly, and beam intensity modulating means are used to produce a complex flicker-free three-dimensional presentation in the image space.

7 Claims, 8 Drawing Figures

ORTHOSCOPIC IMAGE TUBE

BACKGROUND OF THE INVENTION

1. Field of the Invention

The present invention relates generally to cathode-ray display devices, and more particularly, to cathode-ray display devices providing an orthoscopic image effect for three-dimensional display.

2. Description of the Prior Art

The provision of a truly effective three-dimensional presentation has been a long felt want in various technological industries. With the advent of holographic film recording techniques, and its striking effect in respect to depth perception, interest in three-dimensional image forming methods of all types has been reawakened. Since the cathode-ray tube display is such a basically versatile device, efforts have been made from time to time to cause it to generate realistic three-dimensional displays. In the prior art these efforts have always involved an indirect approach without a basic change in the structure or operation of the cathode-ray tube itself.

One common approach was based on presentation of a pair of stereoscopic images of the eyes using optical techniques to separate the left and right eye views. Such arrangements have found application in the monitoring of remote or hazardous operations using two television cameras set up at the remote site. Presentation of the pictures developed by the two cameras was effected on separate cathode-ray tubes. Through an arrangement of lenses and prisms the images were kept separate and brought discretely to the eyes of the observer. An operator is required to look into the eye pieces to see the resulting stereoscope effect.

Variations on that basic arrangement have been considered or tried, including two-color cathode-ray tubes with (for example) red and green phosphors. The use of red and green glasses then affords the optical filtering necessary to separate the images (anaglyph). Also, the images from separate cathode-ray tubes may be projected through polarized filters, the projection screen being viewed through matching polarized glasses (the so-called vectograph).

Other prior art techniques involve mechanical scanning of a volume, either by rapidly moving a projection screen, a cathode-ray tube or its internal phosphor screen to produce the third dimension. A comparatively recent variation on this theme uses an aluminized mylar sheet stretched over a loud speaker. The loud speaker is driven at a relatively low frequency (for example 30 hz), and the changing shape of the mylar forms a variable convex or concave mirror which images a point of light at varying depths. The light source is a spot on the face of a cathode-ray tube, deflected in synchronism with this "varifocal" mirror. Along with the image generated in space, a loud 30 cycle hum results.

The known optical and mechanical prior art techniques have inherent disadvantages that restrict their use. Some of these disadvantages include the requirement for looking directly into eye pieces or the wearing of glasses. Although the images formed have depth, natural shifting with head-motion is not achieved and there are no multiple images necessary to provide the physically realistic parallax effect inherent in an actual physical three-dimensional situation.

Prior art volume scanning techniques all involve electro-mechanical apparatus of some kind, and are therefore inherently large in size, slow-acting, and susceptible to failures or misalignment. In a volume scanning system, the full volume must be scanned at least thirty times a second to avoid annoying flicker effect. Synchronization of the cathode-ray tube raster with the moving image plane is a critical adjustment at best and to provide it, considerable complexity of equipment results.

Aside from the laser-based technique of holography, a most attractive method for presenting three-dimensional images which exhibit the proper parallax for realism, is called integral photography. That process makes use of an array of tiny lenslets to record the local lightwave fronts that exist at each lens position. Such an array is sometimes called a "fly's eye" lens because of the similarity to its namesake. The picture formed at the focal plane of each lenslet contains elements which describe both the direction and intensity of each light ray passing through the lens. If a point of light is placed in front of the lens array, a mosaic of hundreds of tiny pictures of the light source is formed at the focal plane. Each of these individual pictures is different, depending on the angle at which the corresponding light ray approached each lenslet of the array.

In integral photography, a photographic plate is exposed to this picture mosaic, and a positive transparency developed therefrom. When the transparency is replaced at the focal plane of the lens array and illuminated from behind with ordinary non-coherent light, the lens array operates in reverse to reproduce the original light wavefronts; and an image of the point of light can be observed at its original position in space. If the point of light is moved around during the exposure, the image will appear as a solid line of light in space.

The advantage of this so-called integral photography technique is that a good quality "solid" image can be formed without the use of laser illumination; and, moreover, no special glasses are required. The observer can "see around" the image as he moves his head from side to side.

The so-called fly's eye lens array, which is used in the present invention, is known per se and, in fact, is commercially available. The same is true of the fiber optic element used.

For background in the arts relating to the present invention, particularly in respect to integral photograph and various aspects of the employment of "fly's eye" lens arrays, there is a wealth of information available in the technical literature. A short list of such references comprises the following:

1. "Holography and Integral Photography," a technical paper published in the Journal "Physics Today," Vol. XXI, No. 7 (July 1968).

2. IBM Research report No. RC1767 entitled "3-D Imagery and Holograms of Objects Illuminated In White Light" by R. V. Pole — IBM Watson Research Center, Yorktown Heights, N.Y., Feb. 8, 1967.

3. A Bell System Laboratories paper by C. B. Burckhardt, entitled "Optimum Parameters and Resolution Limitation of Integral Photography," published in the Journal of The Optical Society of America, Vol. 58, No. 1,(January 1968).

4. "Various Design Considerations of Three Dimensional Photographic as Well as Synthesized Displays Using Fly's Eye Lenslets," a paper by H. J. Gerritsen, Physics Dept., Brown University, Providence, R.I. (presented September 1969 at the IEEE Electro-Optical Systems Design Conference).

5. "Anaglyph Stereoscopic CRT Display System," an article by John Wolvin, published May/June 1969 in the Journal "Information Display."

6. "Cameras That Wink Can Produce 3-D TV," an article by M. G. Maxwell, published in "Electronics" magazine (McGraw Hill) Mar. 18, 1968.

7. "Stereoscopic Drawing by Computer-Is It Orthoscopic?", an article by Bernard G. Saunders, published in the Journal "Applied Optics," Vol. 7, No. 8 (Aug. 1968).

8. "3-D Computer-Generated Movies Using a Varifocal Mirror," an article by Eric G. Rawson in the same August 1968 issue of "Applied Optics."

SUMMARY OF THE INVENTION

In consideration of the aforementioned prior art disadvantages, it was the general objective of the present invention to produce a completely non-mechanical, relatively compact, three-dimensional imaging device which would provide a realistic "solid" image with natural parallax and not require the use of special glasses or other aids by the observer.

An orthoscopic imaging cathode-ray device is provided. The display of the invention is intended for use where X, Y and Z data are provided as, for example, from digital memory storage for use with a computer graphic display. As is normal in cathode ray displays, it is intended that intensity gates (synchronous with the X, Y and Z data) be provided so that the phosphor screen of the device is not illuminated during beam transit times.

The device of the invention may be thought of as an improved display whereby a computer graphic system (which in the prior art is normally a two-dimensional display) can be provided with realistic and practical three-dimensional effect. The technique for storing the necessary X, Y and Z control data in digital form is available in the prior art of computer graphic displays. The control of X and Y deflection coordinates in a cathode-ray device by digital methods is also well known. That type of deflection control is particularly applicable to the present invention.

The principal elements of the orthoscopic image tube in accordance with the present invention comprise the wide-beam electron gun (multi-beam array), and horizontal and vertical deflection means (preferably magnetic), the latter being adapted for digital control. A dynamic electron beam focusing arrangement (preferably electro-magnetic) is also required for Z axis control of the imaging point. The imaging components include a high resolution phosphor layer energized by the electron beam through an aperture lens array. The multiple images established on the high resolution phosphor layer are transferred by a fiber optic face plate to a fly's eye lens array and thence to the eyes of the observer. From knowledge of the prior art, it will be understood that the computer graphic X, Y and Z data might be originally recorded in a computer memory as equations describing the locus of a point in space.

The manner in which the invention is implemented in detail will be hereinafter described.

Figure 2:
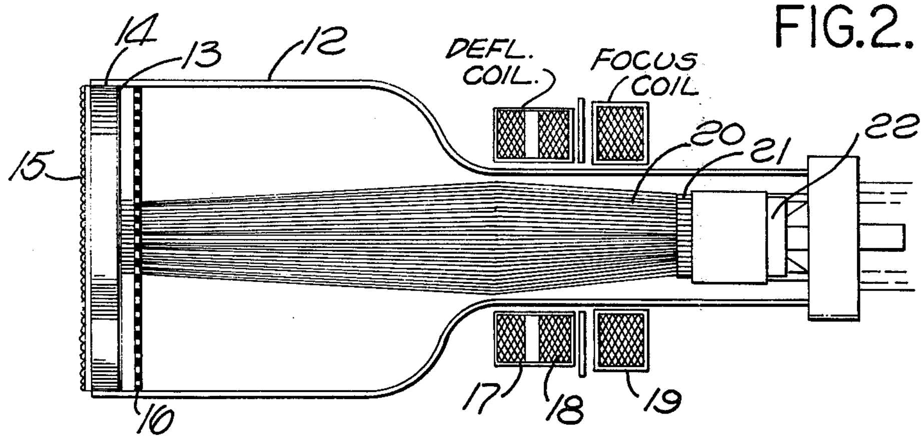
FIG. 2 is a simplified diagram of the orthoscopic image cathode-ray tube according to the present invention.

FIGS. **2*a*, 2*b* and 2*c* are enlarged details of certain elements of the cathode-ray tube assembly of FIG. 2.**

Figure 3:
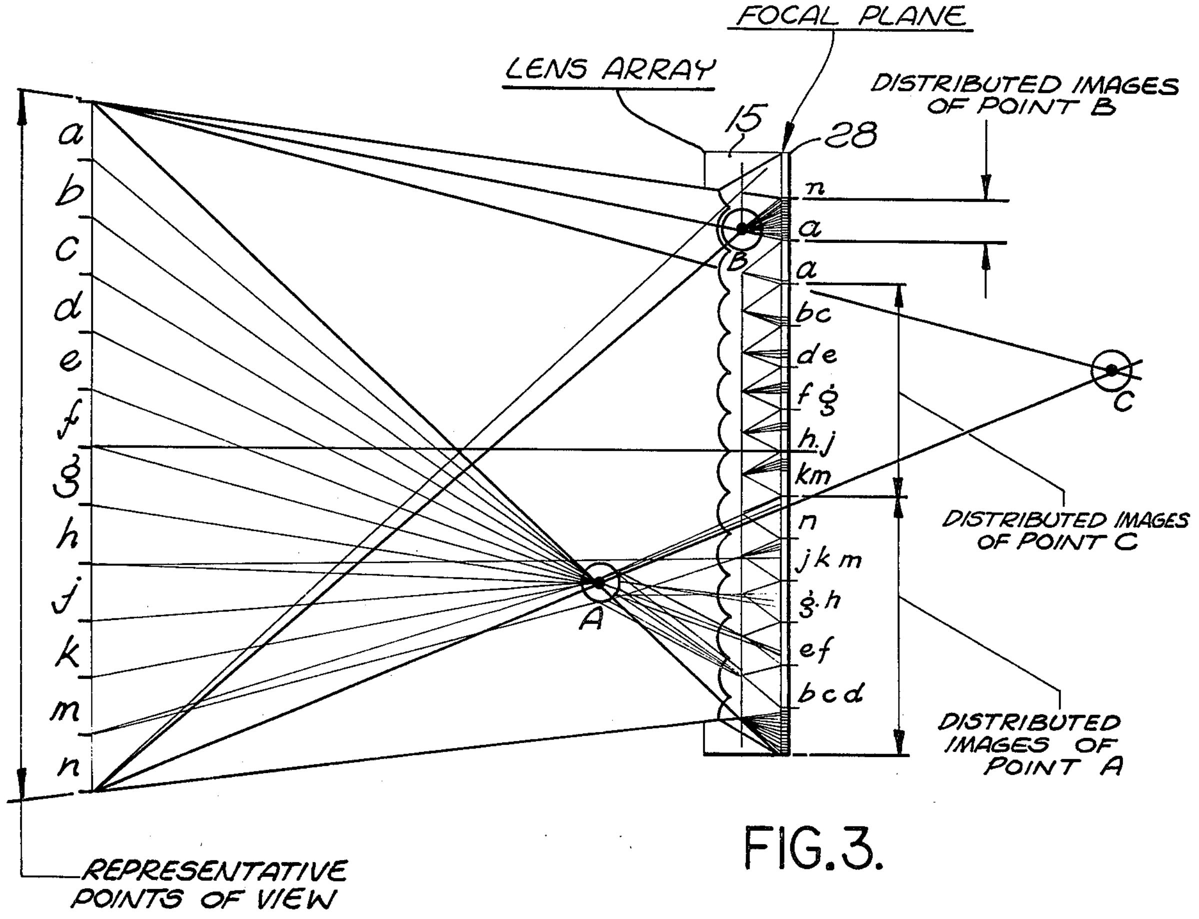

FIG. 3 is an explanatory diagram showing orthographic image formation by visual optics.

Figure 4:
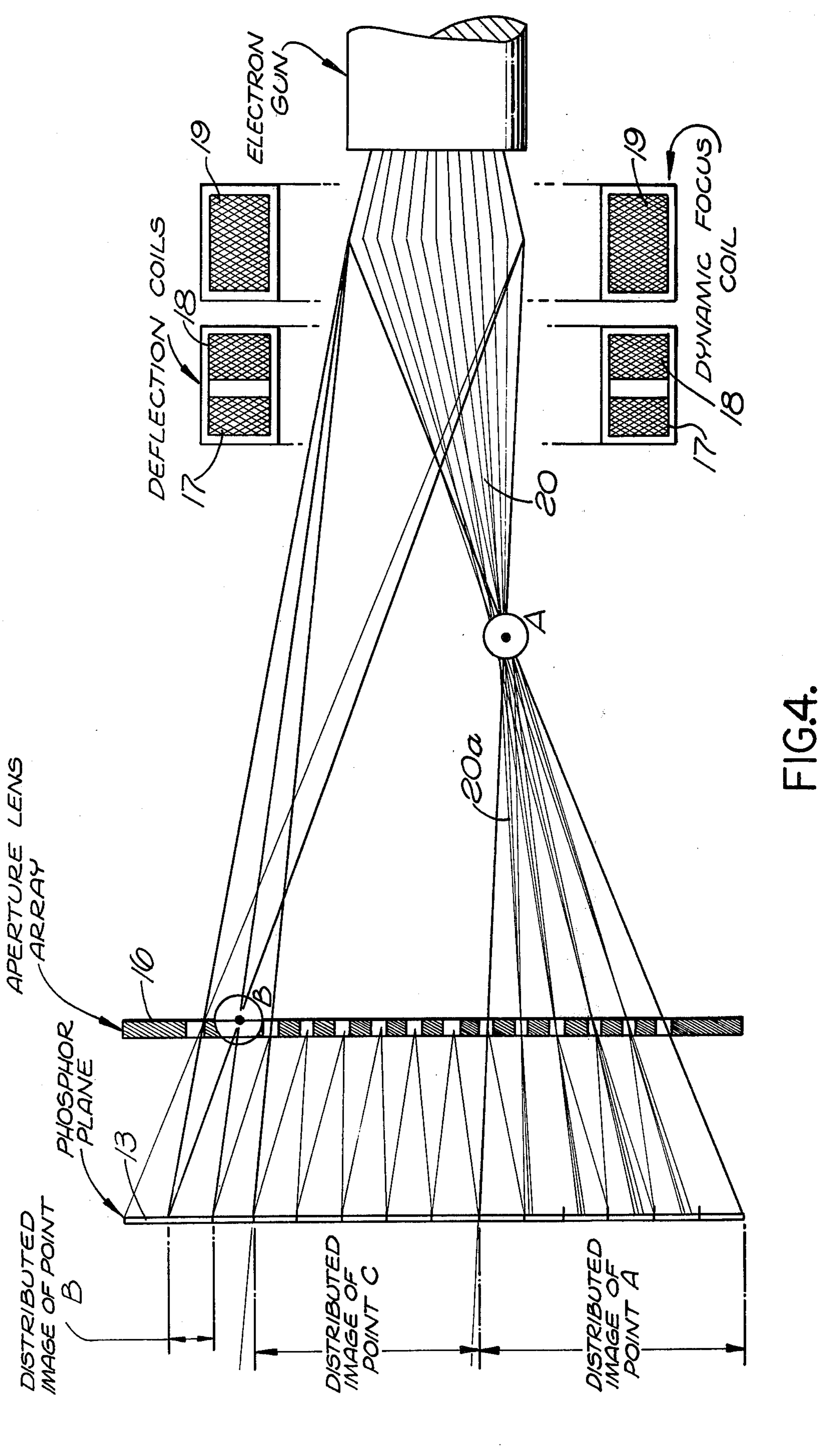

FIG. 4 is an explanatory diagram showing orthographic image formation by electron optics.

Figure 5:
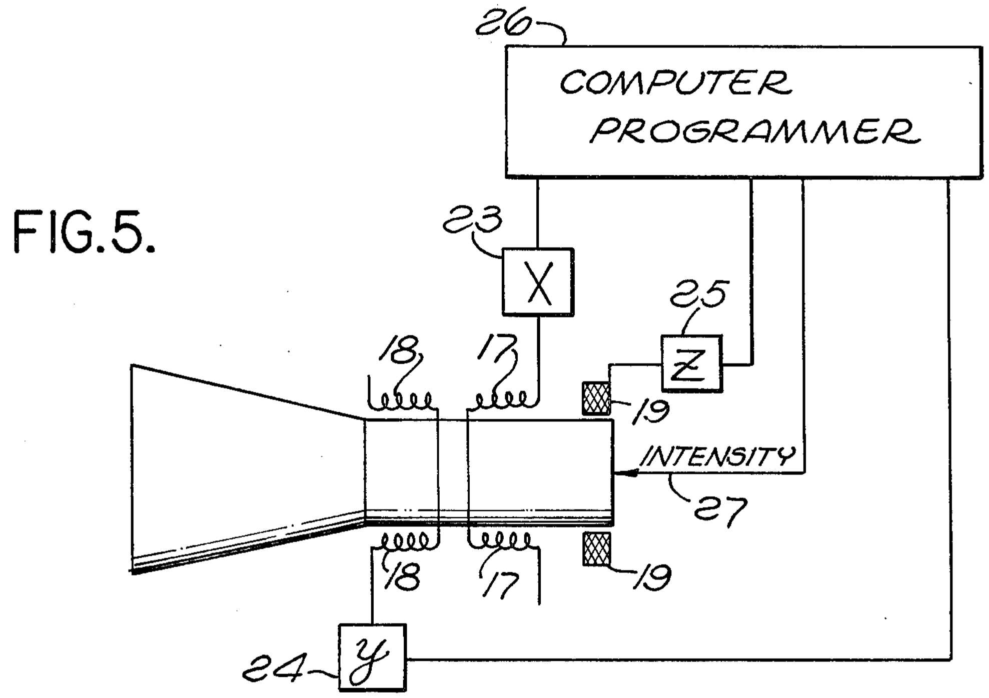

FIG. 5 is a simplified block diagram of a system employing the orthoscopic image tube of the invention.

DESCRIPTION OF THE PREFERRED EMBODIMENTS

Figure 1:
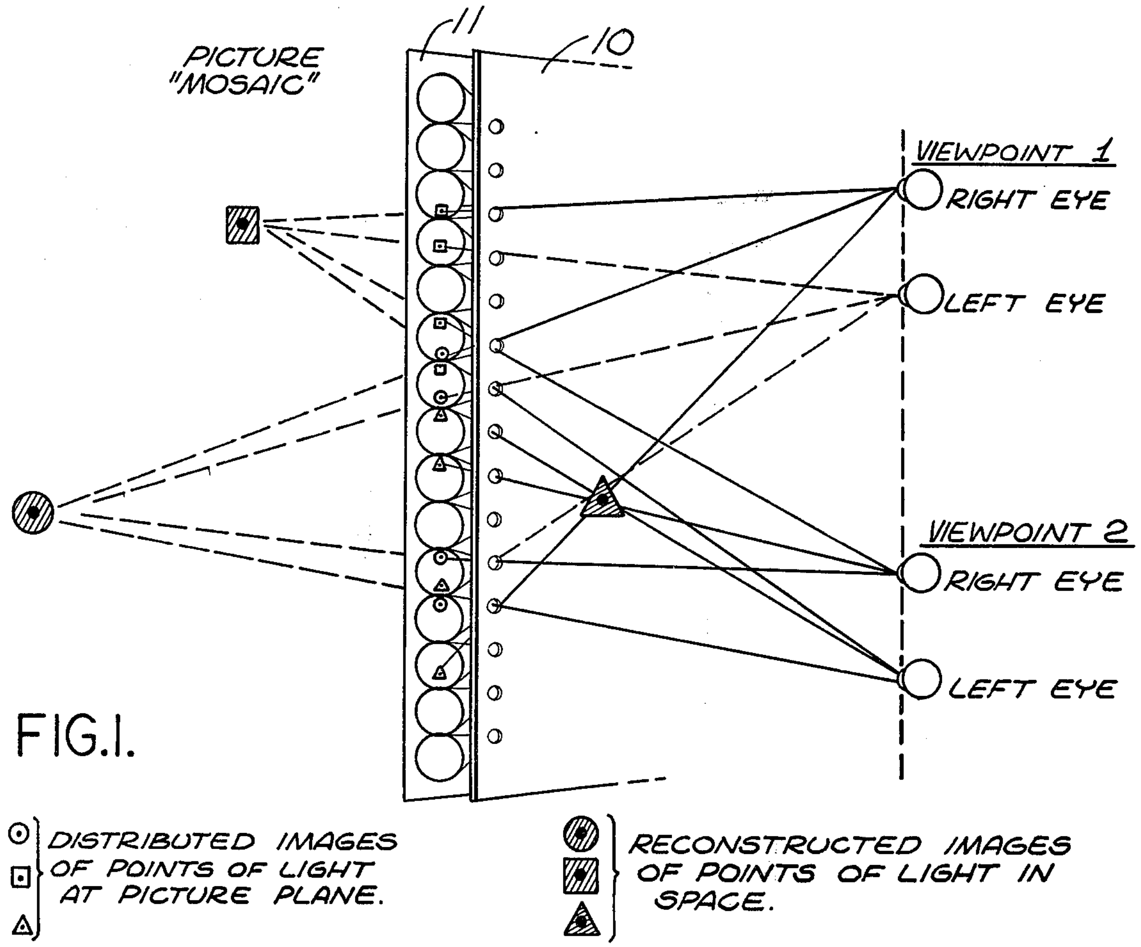
FIG. 1 is a simplified diagram illustrating three-dimensional image reconstruction based on the principles of integral photography.

Referring now to FIG. 1, a simplified diagram illustrating the three-dimensional image reconstruction based on the principles of integral photography is shown. Two points of view have been selected, each with right and left eye positions. A pin-hole lens array 10 serves as a simplified fly's eye lens array for this explanation. The "picture plane" 11 contains the recorded multiple images of the three points represented as a circle, square and triangle. The small triangles on the picture plane (or film 11) will be seen to represent the different angles of view of the large triangle. The same may be said of the circle and square images comprising the picture mosaic. If it is assumed that the picture plane 11 is illuminated, then the observer's eyes in each position see the particular mosaic components which are visible through the pinhole array at the particular view angle. From the lines of view drawn from each of the two viewpoints, the reader will understand how the observer can "look around" the reconstructed points of light in space corresponding to the large circle, square and triangle illustrated in FIG. 1.

Referring now to FIG. 2, the details of construction of the orthoscopic tube in accordance with the present invention are illustrated. This novel display tube includes the usual evacuated enclosure 12, with electron gun 21 and an assembly 22 containing the intensity control electrode, the cathode and the heater. The electron gun 21 is actually of the wide-beam (multi-beam electron gun array) type. This type of electron gun provides a "flood" of electrons of relatively large cross-section. Such electron gun arrangements are known per se, and have been used in various specialized cathode-ray tube devices. This electron "flood" beam is illustrated at 20.

A high resolution phosphor layer 13 provides the multiple imaging plane along which the picture mosaic is formed, in a manner comparable to the image formation on 11 in FIG. 1. Actually it may be said that the electron beam 20 acts as the source of light (analogously) for picture mosaic formation. An aperture lens array 16 provides for excitation of discrete points along the phosphor surface 13 at corresponding appropriate angles, much as seen from FIG. 1.

A fiber optic faceplate 14 carries the phosphor image pattern or mosaic forward to the "fly's eye" lens 15. From there, it can be viewed in accordance with the theory set forth in FIG. 1.

The input data to the orthoscopic cathode-ray tube is X, Y and Z information at any instant, plus the usual intensity gating for blanking between pieces of discrete data.

The deflection coil assembly comprising a horizontal and vertical deflection coil 17 and 18, respectively, provides the means for producing horizontal and vertical sweep or scan of the electron beam. Focus coil 19 is actually a dynamic focusing element adapted to produce rapid changes of the electron beam focus in order to provide Z axis variation in the beam focus point. That concept is more thoroughly described in connection with FIGS. 3 and 4.

A schematic block diagram illustrating the deflection and dynamic focus connections is given at FIG. 5. That figure will be discussed in more detail hereinafter.

Figure 2A:
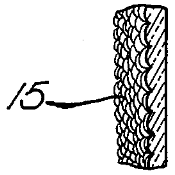
Figure 2B:
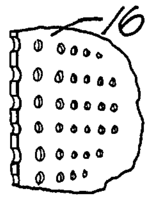
Figure 2C:
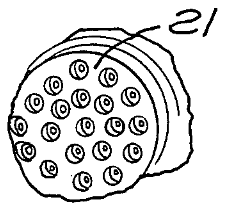

FIGS. 2*a*, 2*b* and 2*c* are self-explanatory, in that they illustrate more clearly, as magnified sections, the "fly's eye lens", the aperture lens array, and the wide-beam electron gun, respectively.

Referring now to FIG. 3, a further explanation of orthographic image formation by visual optics is presented. At the left of the picture are twelve arbitrary, but discrete, points of view or viewing positions looking toward the fly's eye lens array 15. Along the focal plane 28, the multiple or distributed images of the various points are recorded, as for example, on a positive photographic film transparency. The recorded distributed images of points A, B and C, are contained along the focal plane 28 in three discrete areas, as indicated. Obviously, each point's reconstructed image is not viewable from every position (*a* through *n*), at the left of the diagram, but the distributed images present and viewable for each viewing position are indicated within the section corresponding to the distributed images of each of the points A, B and C. For illustration and simplification, the optical resolution in the diagram is limited to twelve visual angles and the fly's eye lens array illustrated is exaggerated (enlarged). In the practical situation, the "granularity" of image distribution would be much less coarse and the individual lenslet would be much smaller than indicated. It will be noted that the distribution of the individual images reverses order in the focal plane area corresponding to the distributed images of the point C, vis-a-vis, the same situation in respect to the images A and B. This is due to the transposition of reconstructed images (corresponding to an original recording situation) about the focal plane of the fly's eye array. The points A, B and C represent three different types of image situations which can be determined from the relationships on FIG. 3.

Referring now to FIG. 4, the functional relationships, in terms of electron optics, within the orthoscopic cathode ray tube of FIG. 2, can be examined in more detail. The points A, B and C are located at positions analogous to the situation depicted in FIG. 3. The fiber optic plate 14 and fly's eye lens 15 are omitted from the showing of FIG. 4. The distributed images of the various points presented on the phosphor plane 13 would be collected and then refracted selectively by the fly's eye lens array, as previously indicated. The phosphor plane 13 may be thought of as analogous to the focal plane 28 of FIG. 3.

As previously pointed out, the multiple image data would normally be stored in a computer memory, much as it is in a so-called computer graphic display. As a class, such devices operate to present mathematical models visually from point-by-point stored data as the display is scanned. In the present invention, the same type of stored data, in general, is contemplated, however, with the unique orthoscopic display of the present invention, realistic three-D mathematical models are achieved. In this connection, it will be helpful to consider FIG. 5 along with FIG. 4, in the further discussion. A computer programmer containing the necessary memory as aforementioned, is shown at 26 in FIG. 5. From this device, programmed X, Y and Z data are provided separately and in the proper time interrelationships to X, Y and Z deflection units 23, 24 and 25, respectively. These devices make the necessary digital-to-analog conversion and drive the X and Y deflection coils 17 and 18 accordingly, much as in known digital scan displays. The Z control unit 25 operates to position the convergence of focus, that is, the Z axis location of the points A and B on FIG. 4 (typically). The wide-cross section electron beam 20 is thus deflected in X and Y by the magnetic field produced by the deflection coil 17 and 18 and the focus point is positioned axially by the dynamic focus coil 19. As previously indicated, an intensity gate to brighten up the spot or spots on the phosphor plane is provided. This allows for normal circuit settle-down time. The aperture lens array 16, also shown in FIG. 2*b*, has its openings spaced to align the phosphor images with the lenslet of the fly's eye array discretely in juxtaposition therewith. Beam geometry can, of course, be scaled to accommodate structural requirements. The aforementioned intensity control pulse, or blanking function control, as it is sometimes called, is shown on FIG. 5, applied at lead 27.

From the foregoing description, the skilled reader will understand that the electron optics depicted in FIG. 4, facilitates the generation of a mosaic image pattern on the phosphor plane 13, comparable to the film transparency previously described in the purely visual optics analog. The electron beams, as they cause the phosphor plane to glow, are comparable to the non-coherent light used to illuminate the so-called film transparency. Thus, the visual, multiple image pattern to be viewed through the fly's eye lens for optical three-D image re-creation is generated from the aforementioned stored X, Y and Z data.

It will be apparent to those skilled in this art that the present invention can be adapted to other forms of data input, for example, to the plural camera arrangement sometimes used to view an object (for example, a hazardous, nuclear process, etc.) from various angles.

Some functional aspects of the present invention should be particularly emphasized and amplified as follows, for a clear understanding of the invention. The phosphor screen used in the orthoscopic cathode ray tube of the present invention may be of medium persistence, although the exact persistence of the phosphor is not critical where no rapid motion is involved. The phosphor must however, be one affording high resolution.

The so-called fiber optic face plate (element 14 in FIG. 2) may actually be a part of the glass enclosure 12. Cathode ray tube face plates are necessarily made from relatively heavy glass, in view of the pressure differential from atmosphere to the interior of the envelope. The fly's eye lens array has an inherently short focal length for each of its lenslets, i.e., a few hundredths of an inch or less. Accordingly, the picture mosaic on the phosphor at the inside of the face plate must be carried out intact to the external enclosure surface in order to optically match the fly's eye array. Such fiberoptic face plates are known and have been used in certain cathode ray tube operations involving direct printing on film. The diameter of each optic fiber in the face plate is less than 10 microns, so that little or no image degradation is thereby contributed. Basically, the invention effects simulation of a point of light in space by controlling the convergence of a wide electron beam and deflecting it across the aperture lens array, as hereinbefore described, particularly in connection with FIG. 4. Thus, on FIG. 4, the point A, for example, simulates a point of light from which the electron beam diverges at 20*a*. It will be readily understood that the location of point A, vis-a-vis, the aperture lens array, determines which apertures (see FIG. 2b) receive the electron beam and at what angles.

The cross section of the beam as it enters the focus coil field is analogous to the cross section of light rays passing through the finite optical field of view. That is, rays from one edge of the beam will always produce light rays directed toward an observer at the corresponding edge of the visual field of view. To the observer, the light ray will appear to come from the imaged "source" or convergence (cross-over) point.

As has been described, the convergence of the electron beam is controlled by a dynamically responsive focus coil. The focus coil assembly is constructed to provide a wide dynamic range, from no focusing at all, to a variety of focal points between the phosphor plane and the deflection coils.

If the beam is forced to converge before it reaches the aperture lens array, the diverging rays from this crossover point cause images to be produced on the phosphor as though a point of light existed at the crossover point. To the observer, the image of the point of light is reconstructed above the surface of the CRT, since the lenslets are on the opposite side of the picture plane.

If the beam is brought to a focus at the aperture lens array, (as at B on FIG. 4), only one "picture" will be illuminated, and light from every point on that picture will radiate out the single front lenslet to fill the field of view. The image will appear at the surface of the CRT.

If the beam does not converge completely within the CRT envelope, but to some virtual focal point beyond the face of the tube, the resultant image will appear below the faceplate, inside the CRT.

The relationship between the changes in beam diameter at the aperture lens array, and the apparent change in depth is determined by the operator's field of view for which the tube is designed.

To give an example, assume a 10 inch diameter orthoscopic image tube, designed for an operator seated about 16 inches away (this distance is not critical) and allowing for about 6 inches of head motion to either side. When the electron beam is focused directly on the lens array, the point of light appears at the tube face. By defocusing the beam to a diameter of 2 inches at the lens array, the image will appear 3.5 inches behind the tube face. By bringing the beam to a focus internally, causing the rays to cross over and diverge to a 2 inch diameter beam at the lens array, the image will appear about 2.3 inches in front of the tube face.

The foregoing example demonstrates that the greatest change in depth relative to beam convergence occurs when the beam is defocused rather than focused internally. The widest range of useful image depth will lie "beneath" the display surface.

The electron gun must produce a large diameter beam which continues to diverge, if not acted on, by the focus coil. It is not necessary to have a smoothly distributed beam at the gun exit, a multiple narrow beam array as illustrated suffices. The beams are relatively closely spaced, so that dispersion within the many narrow beams produces a reasonably uniform wide beam by the time it gets to the screen. The requirement for uniformity depends on the resolution of the rest of the optical system. Beam current is varied in a conventional manner by the control electrode bias voltage.

The electron beam geometry is a mirror image of its light ray and optical field of view counterpart, but it does not exhibit 1 to 1 dimensional correspondence. For example, assume a tube structure which restricts the electron beam to a maximum diameter of 2 inches as it passes through the de-energized focus coil, diverging to cover an area 6 inches in diameter at the tube face. The aperture lens array can be laid out to form images that match those which would be produced by a converging electron beam from a 12 inch diameter source 16 inches away, or any other set of dimensions, within reasonable limits.

Variations of this example tube design are, of course, possible. For instance, the deflection and focusing system can be constructed using either electrostatic or electromagnetic elements. Each system has certain advantages and one may be desired over the other for particular applications.

A reduced mode of orthographic imaging is possible, using the horizontal axis only. This would be practical where the observer is expected to remain seated in front of the display, with a minimum of up and down head motion. This is done by replacing the spherical lenslet array with vertical rows of cylindrical lenses, similar to the arrays used for three-D postcards and novelties. A flat "fan beam" from the electron gun, and an electrostatic focusing electrode array provides dynamic beam convergence control for the horizontal axis only. This approach may produce a more economical tube for many applications.

Another variation using the cylindrical lens array would contain two conventional electron guns, side by side, directed in such a way that the left hand beam passes through the aperture lens array to illuminate the right side of each local "picture," and the right hand beam would illuminate the other side. From a central position in front of the tube, the observer's right eye would see only the image intended for that eye, and the left eye would see the other. This tube variation will not produce a true orthographic image, but is a very practical approach for viewing the steroscopic pictures from two remotely mounted television cameras. Both electron beams could be deflected with a common yoke if the cameras operated from the same synchronizing pulses.

There are many potential applications for the orthoscopic image tube. Probably the most important of these will be as the display tube for a computer graphics terminal. Output data can be plotted rapidly in three dimensions to give the operator a powerful visual insight into the behavior of many complex functions. Computer-generated "models" of hardware designs can be studied and modified by the engineer. As a piece of peripheral equipment, an orthoscopic image tube without the external lenslet array could be used to expose film, producing permanent copies of the computer output. By laminating the developed transparency to a plastic copy of the lenslet array, the original image can be observed.

Air traffic control radar terminals, and pencil beam radar sets of most any kind, can benefit from the use of this tube in their displays. The orthoscopic generation of pencil beam radar sweeps is relatively simple. For example, if the radar site is placed at one end of the image space, all sweeps would be deflected out from this point. Video returns from aircraft and the like would produce bright spots in the image space, providing the operator with an accurate model of the position of all objects within the radar surveillance space. A display coordinate rotation and translation generator could be inserted in series with the deflection inputs for varying the point of view of the display. The operator could scan any region of interest or rotate his point of view simply by moving a steering control.

The orthoscopic image tube can be used as a simulator display, a contact analog display, or as an aircraft navigation instrument. It can be used in any application where the depth of the image can give greater impact or meaning to a visual data display.

Other modifications and variations will also suggest themselves to those skilled in this art, once the principles of the present invention are understood. Accordingly, it is not intended that the illustrations, or this description, should be considered as limiting the scope of the invention.

What is claimed is:

1. A cathode ray orthoscopic image display device for forming three dimensional presentations from programmed X, Y and Z signals, comprising:

an evacuated enclosure;

means within said enclosure for producing an electron beam of relatively large cross-section;

a phosphor screen along a transparent predetermined portion of the inside surface of said enclosure;

deflection means for causing said electron beam to scan over at least a portion of the surface of said phosphor screen;

a fly's eye lens array adjacent and substantially parallel to the viewing surface of said phosphor screen;

and an aperture lens array comprising an apertured plate adjacent and parallel to said phosphor screen within said enclosure, said plate containing a plurality of apertures each substantially aligned with a corresponding lenslet within said fly's eye lens array on the opposite side of said phosphor screen;

and means for effecting dynamic focus control whereby the point of crossover from convergence to divergence of said electron beam may be controlled in accordance with said Z signal.

2. Apparatus according to claim 1 including a fiber optic plate between said fly's eye lens array and said phosphor screen.

3. Apparatus according to claim 1 in which said fly's eye lens array is defined as having a very short focal length for each lenslet thereof, and in which a fiber optic faceplate is provided as the portion of said enclosure between said phosphor screen and said fly's eye lens array whereby the picture mosaic on said phosphor is optically projected intact substantially to the outside surface of said faceplate substantially in contact with said fly's eye lens array.

4. Apparatus according to claim 1 in which said means for effecting dynamic focus control comprises an electromagnetic focus coil, and means are included for converting said programmed Z signals to instantaneous focus coil current values, whereby said electron beam crossover point is correspondingly axially controlled.

5. Apparatus according to claim 1 in which said deflection means comprises horizontal and vertical beam deflecting devices responsive respectively to said X and Y programmed signals.

6. Apparatus according to claim 5 in which said horizontal and vertical beam deflecting devices are magnetic deflection coils, and means are included for converting said programmed X and Y signals to instantaneous current values in the corresponding deflection coils.

7. Apparatus according to claim 6 in which said fly's eye lens array is defined as having a very short focal length for each lenslet thereof, and in which a fiber optic faceplate is provided as the portion of said enclosure between said phosphor screen and said fly's eye lens array whereby the picture mosaic on said phosphor is optically projected intact substantially to the outside surface of said faceplate substantially in contact with said fly's eye lens array.

* * * * *